United States Patent [19]
Barron

[11] Patent Number: 6,108,962
[45] Date of Patent: Aug. 29, 2000

[54] FISHING LURE

[75] Inventor: Thomas J. Barron, Paso Robles, Calif.

[73] Assignee: SoundBite Corporation, Reno, Nev.

[ * ] Notice: Under 35 U.S.C. 154(b), the term of this patent shall be extended for 2 days.

[21] Appl. No.: 08/620,993

[22] Filed: Mar. 22, 1996

[51] Int. Cl.⁷ .......................... A01K 75/02; A01K 85/00
[52] U.S. Cl. .......................... 43/42.31; 43/17.6
[58] Field of Search .................. 43/17.1, 17.5, 43/17.6, 42.31

[56] References Cited

U.S. PATENT DOCUMENTS

| | | | |
|---|---|---|---|
| 2,757,475 | 8/1956 | Pankove | 43/17.1 |
| 2,784,399 | 3/1957 | Smith | 43/17.1 |
| 2,920,318 | 1/1960 | Balcken | 43/17.1 |
| 3,940,868 | 3/1976 | Northcutt | 43/17.6 |
| 4,227,331 | 10/1980 | Ursrey | 43/17.6 |
| 4,805,339 | 2/1989 | Fuentes | 43/42.31 |
| 4,811,513 | 3/1989 | Grobl | 43/17.6 |
| 5,157,857 | 10/1992 | Livingston | 43/17.5 |
| 5,175,951 | 1/1993 | Fruchey | 43/17.6 |
| 5,177,891 | 1/1993 | Holt | 43/17.1 |
| 5,330,282 | 7/1994 | Rodgers | 43/17.6 |

*Primary Examiner*—Kurt Rowan
*Attorney, Agent, or Firm*—Trask Britt

[57] ABSTRACT

A device which functions to influence, either by attracting or repelling, fish includes a first housing containing a pulse train generator and a second housing containing a transducer. The transducer produces fish-influencing action in response to pulses emitted by the pulse train generator. The first and second housings are mechanically integrated into an operating system, and the pulse train generator and the transducer are electronically integrated into that system.

36 Claims, 4 Drawing Sheets

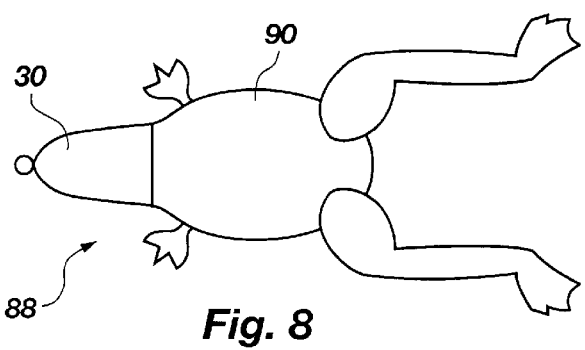
Fig. 8
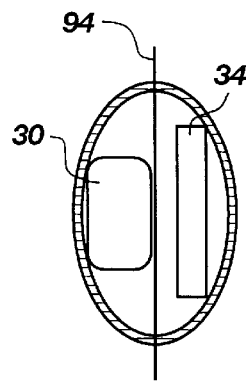
Fig. 11
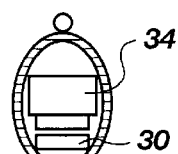
Fig. 9
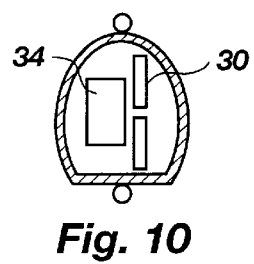
Fig. 10
Fig. 12
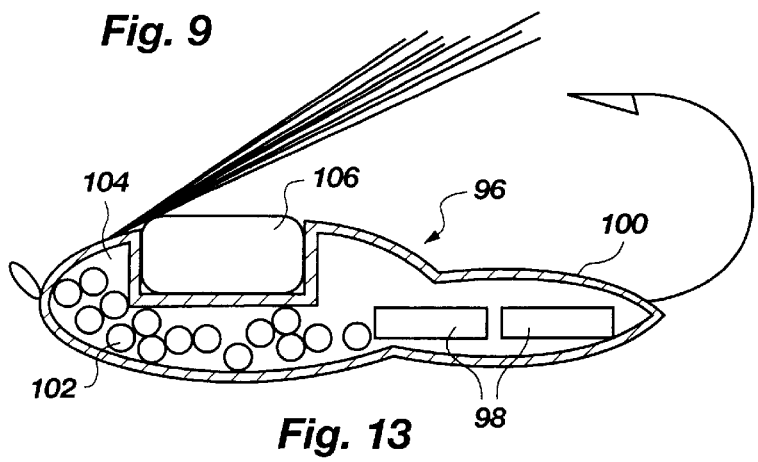
Fig. 13
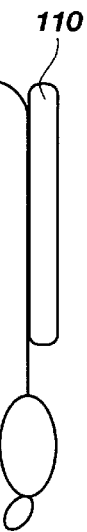
Fig. 14
Fig. 15
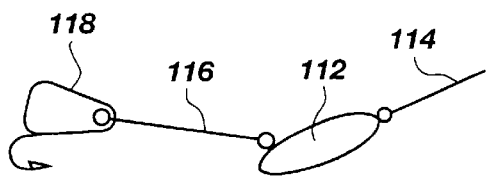
Fig. 16
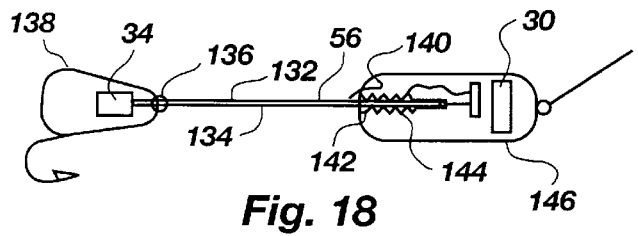
Fig. 18
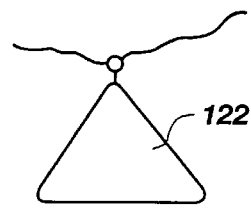
Fig. 17

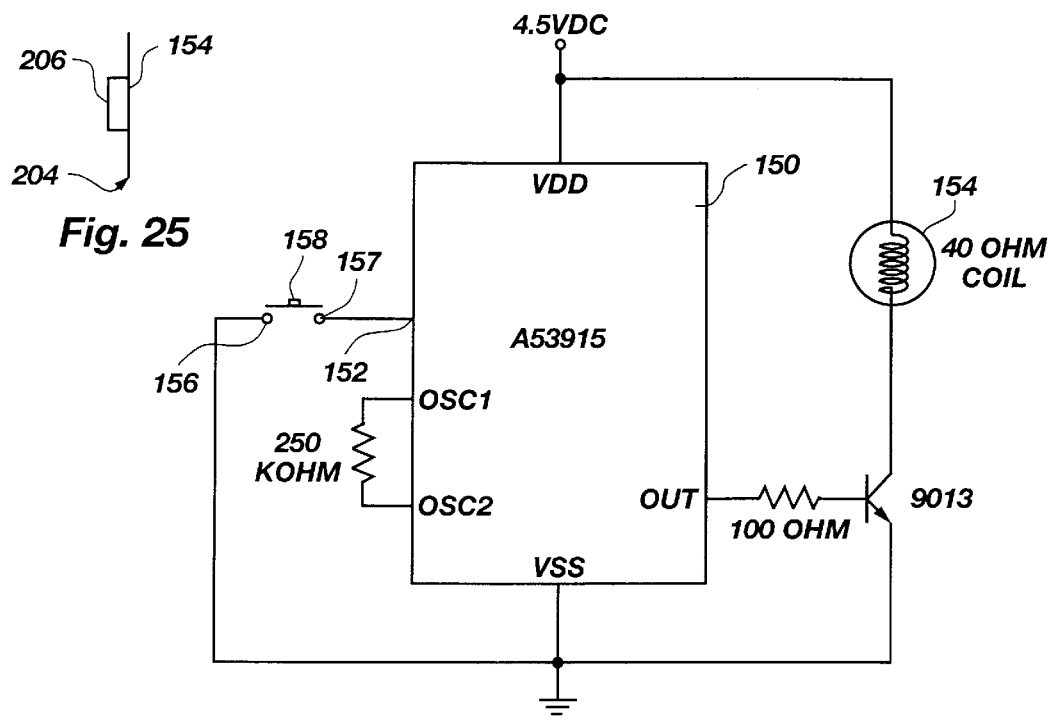
Fig. 25
Fig. 19
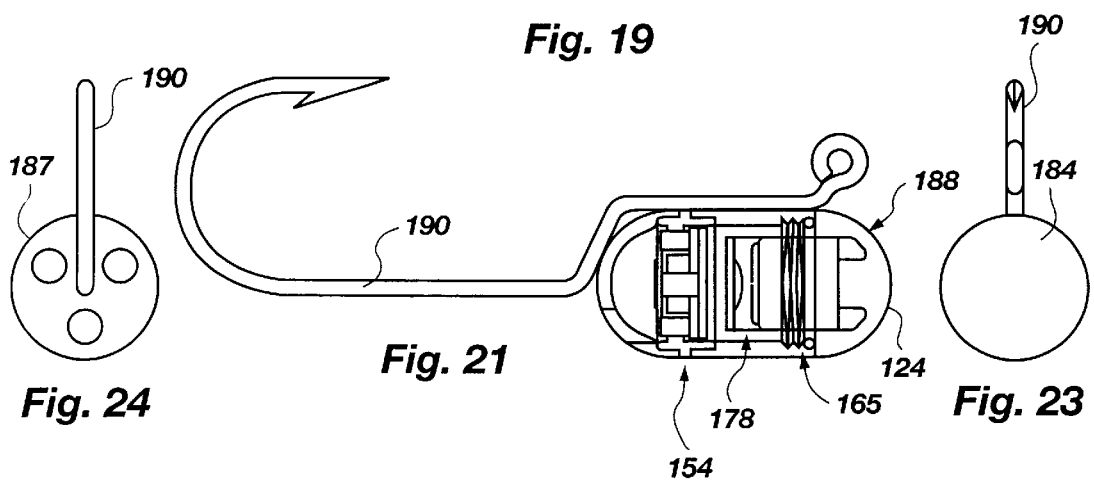
Fig. 24
Fig. 21
Fig. 23
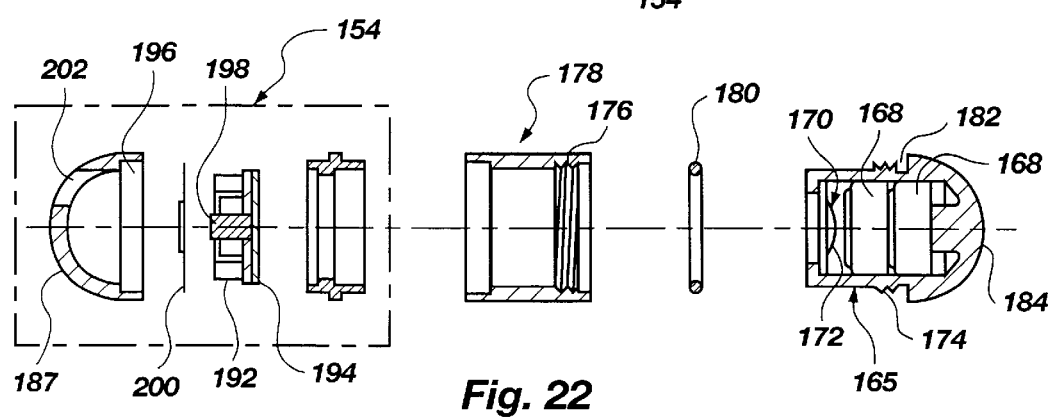
Fig. 22

FISHING LURE

RELATED APPLICATIONS

This application is commonly assigned with Ser. No. 07/910,635, filed Jul. 8, 1992, which is a continuation-in-part of Ser. No. 07/837,662 filed Feb. 14, 1992, now issued as U.S. Pat. No. 5,237,771, which is a continuation of Ser. No. 07/715,730, filed Jun. 17, 1991 (now abandoned); which is a continuation of Ser. No. 07/587,251, filed Sep. 24, 1990 (now abandoned); which is a continuation of Ser. No. 07/354,917, filed May 22, 1989, now issued as U.S. Pat. No. 4,960,437. The disclosures of each of these commonly assigned applications are incorporated by reference in this disclosure for their descriptions of previous designs of signal generating devices and various fishing lures and techniques incorporating such devices.

BACKGROUND OF THE INVENTION

1. Field

This invention relates to fishing lures. In particular, this invention pertains to electronic means for attracting fish.

2. State of the Art

It is presently understood that fish typically have a type of inner ear which can hear or sense sound transmitted through the water. It is further understood that fish have lateral line sensing organs which also sense sound. Such lateral line perception is apparently effective for lower frequencies, somewhere between about 4 hertz and 200 hertz. Inner ear sound sensing by fish is believed to be effective for frequencies in the range of between about 2 hertz to about 1000 hertz.

Lateral line sensing is apparently relied upon by fish to establish the relative origin of the sound by direction and depth and possibly even range. Specific sounds may be representative of a minnow and/or other aquatic creature which could be viewed by the fish as food. *The In-Fisherman*, Book #85, April '89, page 42–53. Fish are also believed to be responsive to magnetic and various other EMF fields.

A wide variety of fishing lures includes mechanical or electronic means for attracting fish. For example, U.S. Pat. No. 4,223,467 (Hodges, Jr. et al.) discloses a fishing lure which intermittently buzzes and vibrates upon a change in attitude. U.S. Pat. No. 4,380,132 (Atkinson) discloses a plug with a watertight cavity within which a transducer transmits sound energy into the water. U.S. Pat. No. 2,757,475 (Pankove) discloses an early example of an electrically powered oscillator contained within a fishing lure, the power being generated by the action of water on dissimilar metal electrodes. U.S. Pat. No. 3,310,902 (Godby) discloses a fishing lure containing electrical components which generate a buzzing sound. U.S. Pat. No. 4,805,339 (Fuentes et al.) is directed to an electronically powered transducer fluid coupled to the water to transmit acoustic signals into the water in selected patterns. U.S. Pat. No. 4,583,313 (Dugan, Jr.) also shows a fishing lure housing circuitry to generate signals in a predetermined frequency band. U.S. Pat. No. 4,960,437 (Watson, et al) and U.S. Pat. No. 5,237,771 (Watson, et al) disclose signal generators of various types which may be associated in various ways with fishing lures. For example, they may be incorporated in a lure or they may be embodied as modules comprising a part of a plug, jig, bait rigging, or other lure.

Electronic lures are generally battery powered. They must thus be constructed either in disposable form or to accommodate a replaceable battery. They must also accommodate associated electronic circuitry and switch mechanisms. Extending battery life has represented a technical challenge, as has the provision of reliable switching and miniaturization generally. It has not been practical to provide the advantages of electronic lures in miniature lure devices or in certain popular rigging arrangements, notably a Carolina rig.

There remains a need for a small operational signal-generating device which can be associated with a lure, bait, spinner or jig structure to impart vibrational, acoustic, light or EMF energy to the water. Ideally, such a device should be constructed to be readily added or subtracted to an overall fishing arrangement. It should also be configured to be either stationary or moveable, at the option of the fisherman. Such a device should transmit signals characteristic of currently preferred electronic lures; i.e., preselected in a pattern suggestive of food to fish as well as to provide signals for lateral line sensing by the fish. Ideally, the power supply, sound-generating and switching components of the device should be sufficiently compact and functional to improve the versatility of the practical applications of fish-attracting electronic technology.

SUMMARY OF THE INVENTION

This invention provides a number of enhancements for the signal generators previously available for use with fishing lures. It also provides fish-attracting devices which it is practical to embody in sinkers, such as may be incorporated in a Carolina rigging, for example, bobbers, or other arrangements not easily achieved previously. The power supply may be provided separately from the signal-generating circuitry of the device, thereby facilitating miniaturization of lures. The signal-generation circuit may be embodied as a sound pack, which may additionally include a power supply, typically one or more miniature batteries.

A sound pack of this invention may be configured for placement in any convenient location separate from a lure. For example, a sound pack may be connected to a lure which houses a transducer capable of broadcasting EMF signals directly into the water or of producing acoustical signals or light. In any case, the sound pack may comprise a miniature battery in association with simple power supply circuitry. The battery may be replaceable, or the entire sound pack may be disposable. It is feasible to connect the sound pack to the transducer/lure with conductors associated with the fishing line.

In other embodiments, a sound pack, generally without a battery, may be configured for replacement by or interchange with a similarly configured sound pack. Such interchanges are useful for altering the signal pattern or other sound, light or motion characteristics imparted to a lure.

Preferred embodiments of the devices of this invention incorporate sensitive water switches to activate the signal generator only upon submersion in water. Other embodiments incorporate space-saving magnetic reed switches and rely upon the activation of a magnet to turn the device on or off. Other embodiments rely upon on/off pressure switches, usually isolated by a resilient membrane or dome from the water.

The sound packs and transducers of this invention may be sufficiently miniaturized for emplacement, either separately or in association, within a structure comprising a "morsel." As used in this disclosure and the appended claims, the term "morsel" designates an object having a size and configuration appropriate to represent to a fish a bite, mouthful or small piece of food. It is deemed by skilled fishermen to be highly advantageous for such a morsel to evidence the vibrations and/or sounds generally characteristic of genuine morsels expected to be encountered in the vicinity of use.

According to this invention, a fish-attracting or repelling device may be constructed with a first housing containing a pulse train generator and a second housing containing a transducer constructed and arranged to produce fish-influencing action in response to pulses emitted by that pulse train generator. The device will ordinarily include a mechanical means for associating the first and second housings into an operating system and an electrical means for connecting an electronic output from the pulse train generator in driving relation with the transducer. The device is most often embodied as a fish-attracting system in which a pulse train source is connected in circuit with a transducer to emit audio or acoustic signals of predetermined pattern or properties. The pulse train source may be installed in a first container, and a transducer may be installed in a second container. At least one of those first and second containers is then adapted to comprise a fish-attracting device, or lure. A fishing lure of the invention characteristically includes a transducer constructed and arranged to produce fish-attracting action in response to pulses emitted by the pulse train generator. In certain specific embodiments, the first and second housings are integrated into a unitary structure included within a fishing lure.

Nearly any transducer device may be adapted for use in accordance with this invention. A currently preferred transducer type is an electromechanical device which includes a flexible diaphragm in association with an electromagnet operably associated with a pulse train generator so that the diaphragm is manipulated by a magnetic field fluctuating in response to a pulse train. The diaphragm may carry a weight in position such that it moves into and out of contact with other structure as the diaphragm is manipulated by the magnetic field. Piezoelectric transducers, of either the ceramic or thin film variety, are also particularly useful. A light emitting diode (LED), LED array or comparable light source may be used in place of or in combination with an electromechanical transducer device.

A device or system of this invention may include one or more replacement containers constructed and arranged to be interchangeable with the first, or pulse train, container. A plurality of such replacement containers may each carry a pulse train source constructed and arranged to provide a pulse train different from pulse trains provided by the pulse train sources carried by the other replacement containers. A power source, such as a miniature battery may be permanently or interchangeably included within each replacement container.

A device or system of this invention may also or alternatively include one or more replacement transducer containers constructed and arranged to be interchangeable with the second, or transducer-containing, container. A plurality of such replacement transducer containers may each carry a transducer constructed and arranged to provide a fish-influencing effect different from the effects provided by transducers carried by the other replacement transducer containers.

Either one of the first and second containers may be configured as a morsel. Alternatively, an integrated structure including both of the containers may be configured as a morsel. A morsel may comprise a crank bait or a jig bait, or simulate a natural fish food, such as a small creature. Certain preferred morsels comprise resilient imitation creatures, such as frogs, tadpoles, insects, larvae or worms. A simulated natural fish food morsel may be constructed to possess selected balance and buoyancy properties.

BRIEF DESCRIPTION OF THE DRAWINGS

In the drawings, which illustrate the best mode presently contemplated for carrying out the invention.

FIG. 8 is a pictorial view of another embodiment of a fishing lure of the instant invention;

FIGS. 9 and 10 are pictorial views, partially in phantom lines, illustrating alternative respective embodiments of a signal generator module of the invention;

FIG. 11 is a side elevation view in section of a signal generator similar to those of FIGS. 9 and 10 embodied as a sliding sinker;

FIG. 12 is a plan view of the sinker embodiment of FIG. 11;

FIG. 13 is a pictorial view of a signal generator device of the invention embodied as a jig bait;

FIG. 14 is a pictorial view of an alternative jig bait embodiment;

FIG. 15 is a plan view of the embodiment of FIG. 14;

FIG. 16 is an illustration of a "Carolina rig," utilizing an assembly of the invention;

FIG. 17 is an illustration of a "Dipsy" sinker embodiment of the invention;

FIG. 18 is a pictorial view of a leader with conductors constituting an element of certain embodiments of the invention;

FIG. 19 is a schematic diagram of a practical pulse train generator circuit for use with the invention;

FIG. 21 is view in side elevation, partially in cross section, of a jig lure of the invention;

FIG. 22 is an exploded assembly view of components of the lure of FIG. 21;

FIG. 23 is a leading end view of the lure of FIG. 21;

FIG. 24 is a trailing end view of the lure of FIG. 21; and

FIG. 25 is a view in side elevation of an alternative transducer diaphragm component.

DESCRIPTION OF THE ILLUSTRATED EMBODIMENTS

Figure 1:
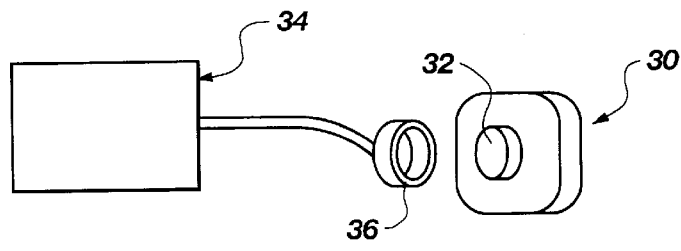
FIG. 1 is an exploded schematic view of an electronic assembly of the instant invention.
Figure 2:
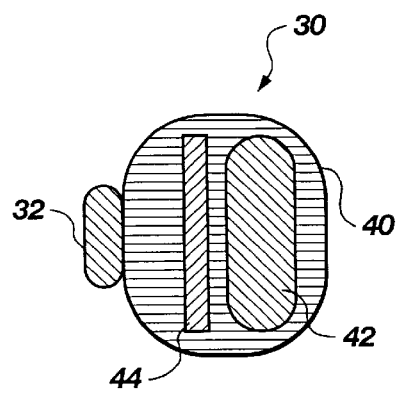
FIG. 2 is a view in cross section of a typical sound pack component of the assembly of FIG. 1.

Referring to FIG. 1, a basic assembly of the invention includes sound pack 30 subassembly, carrying a first connector element 32 and a transducer 34 subassembly carrying a second connector element 36. The connector elements 32, 36, are mutually adapted for coupling engagement; for example, through snap fit, threaded or male/female plug interfaces. FIG. 2 illustrates the construction of a typical sound pack 30, which generally comprises an outer, usually water proof, case 40 containing one or more suitable miniature batteries 42 and a control circuit 44.

The shape and buoyancy of the case 40 are important variables which may be selected as appropriate for incorporation in practical assemblies; notably those illustrated by the drawings. The entire subassembly may be disposable, or it may be structured to accommodate one or more disposable/replaceable batteries 42. The batteries 42 may be selected from any of the disposable or rechargeable configurations otherwise suitable for use for hearing aid, wrist watch, calculator, or similar applications in which available space is a consideration.

The control circuit 44 may include, or be in electrical association with, a switch. A water activated switch, for example, may be positioned to provide power to the circuit 44 when normally open switch terminals are closed by immersion in water. A manual switch may be positioned to be operable from the exterior of the sound pack 30. Alternatively, the connector elements 32, 36 may constitute normally open switch contacts that are closed upon coupling. The circuit 44, which may in some instances be mounted to the surface of the case 40, functions to select the character, duration or pattern of signals emitted from the transducer 34. Suitable circuits also include voltage doublers and voice chips.

Generally, the transducer may be driven by a pulse train, such as may be generated by circuits including various solid state devices; notably, masked read only memory (ROM) devices, application specific integrated circuit (ASIC) devices or discrete components.

FIGS. 3–13 illustrate various practical embodiments which associate a sound pack 30 with one or more transducers 34. These embodiments take advantage of the separation of the transducer(s) 34 from the sound pack 30, thereby enabling the strategic location of each. This approach to design results in an overall reduction in size and bulk. Either component 30, 34 may be permanently installed or replaceable. Interchangeable transducers significantly increase the versatility of each lure capable of receiving them, for example. Interchangeable sound packs, each individually programmed to produce a unique pattern of signals, similarly increase the versatility of a lure or collection of lures. Either or both the sound pack 30 and the transducer 34 may be configured as a portion of a lure; either or both may be positioned on, near, within or remote from a lure.

Figure 3:
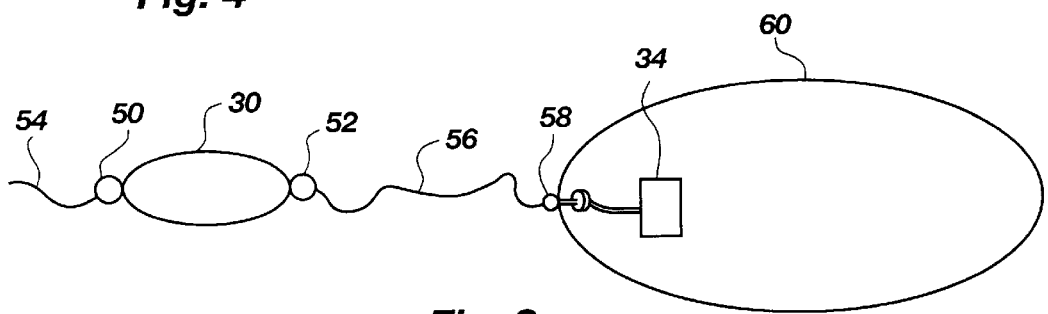
FIG. 3 is a schematic view of a selected embodiment of an operational device of the invention.

FIG. 3 depicts a sound pack 30 with swivel eyelets 50, 52 at its opposite ends. The eyelet 50 connects to a conventional fishing line 54. The eyelet 52 connects to a special leader 56 (see FIG. 18) which includes conductors electrically connecting the sound pack 30, through a fixture 58, to a transducer 34 housed within a lure body 60.

Figure 4:
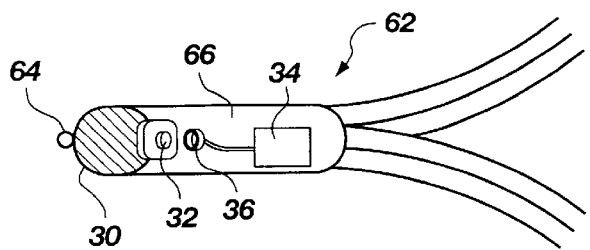
FIG. 4 is a pictorial view, partially diagrammatic, of an alternative "plastic bait" embodiment of the invention.

The plastic bait 62 illustrated by FIG. 4 incorporates a sound pack 30 as its head. It could as readily be located at the opposite end. A fishing line connects to the eyelet 64 in conventional fashion, and a transducer 34 resides in a cavity 66 behind the sound pack 30.

Figure 5:
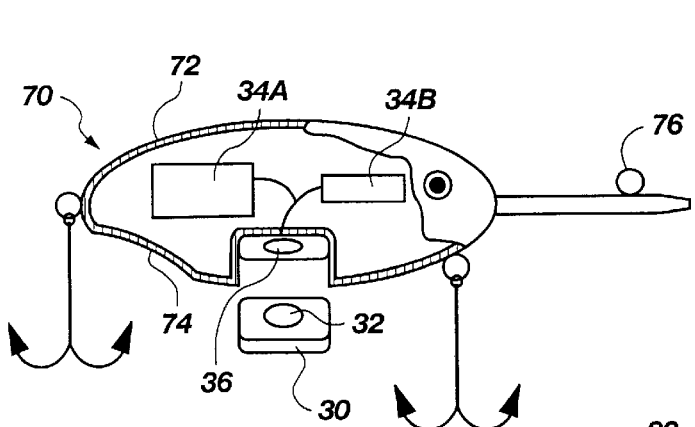
FIG. 5 is a pictorial view, partially in phantom lines, of an alternative "crank bait" embodiment of the invention.

The crank bait 70 of FIG. 5 incorporates two transducers 34A, 34B, within its body 72. The use of two transducers increases the volume and/or variability of the sounds produced. For example, the transducer 34A may be driven by a different pulse train than the pulse train relied upon to drive the transducer 34B. The sound pack 30 fits within a compartment 74, to complete the body 72. With the sound pack so positioned, the connector elements 32, 36 couple to effect an electrical connection between the sound pack 30 and transducers 34A, 34B. The circuit 44 (FIG. 2) may be programmed to alternate between driving the respective transducers, or a mode selection switch may be provided, for example in association with the eyelet 76.

Figure 6:
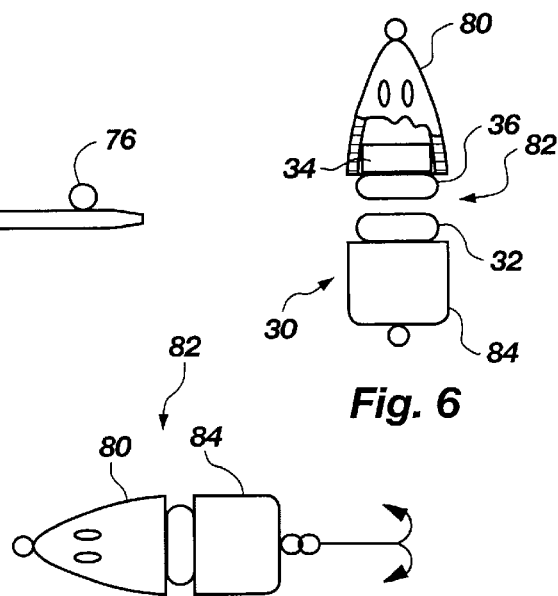
FIG. 6 is an exploded pictorial view of the components of a jig/line embodiment of the invention.
Figure 7:
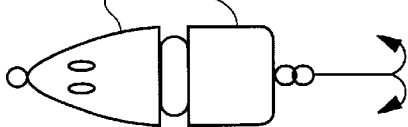
FIG. 7 is a pictorial view of the embodiment illustrated by FIG. 6 in assembled condition.

FIGS. 6 and 7 illustrate an embodiment in which a transducer 34 is installed within a case 80 configured as the head of a jig bait, generally 82. A sound pack 30 is configured as a trailing body part 84. The head 80 and body 84 are assembled by coupling connector elements 32, 36, which in this case, comprise a threaded connector component constructed and arranged to effect electrical connection of the sound pack 30 with the transducer 34.

The frog bait 88 illustrated by FIG. 8 is similar to the plastic bait embodiment illustrated by FIG. 4. A sound pack 30 is shaped approximately as a frog head, and is associated with a soft, resilient body 90, shaped to resemble a frog. One or more transducers (not visible) are mounted within the body 90 as appropriate to effect proper balance. The transducer(s) may be inserted within a cavity in the body 90 or within pockets accessible from the exterior.

The modules of FIGS. 9, 10, 11 and 12 illustrate the manner in which the sound pack 30 and transducer 34 elements may be combined in a container remote from a conventional lure. Separation of these components is of less importance under the conditions of use contemplated for these illustrated modules. Any of the modules illustrated may be of selected buoyancy, from lighter than water to heavy sinker weight. The embodiments of FIGS. 9 and 10 are intended for attachment into a line, usually forward of a bait or artificial lure. The embodiment of FIGS. 11 and 12 is structured to ride or slip on the line 94 to facilitate repositioning. Embodied as a sinker, it will position itself adjacent a lure at the end of the line or against a stop device positioned on the line. In these self-contained modules, the sound pack circuit may be incorporated in the transducer circuitry.

FIG. 13 illustrates an alternative self-contained jig bait 96 in which batteries 98 are positioned within the rear end of a body 100. Weights 102 are positioned within a chamber 104 at the front end of the body 100. The weights counter balance the batteries 98 and otherwise adjust the weight of the jig bait 96. The weights 102 may be loosely packed, if desired, to contribute a "rattle" component to the sounds emitted during jigging motion. A piezo film transducer 106 is attached to the outer surface of the body 100. The miniaturized jig bait illustrated by FIGS. 14 and 15 compresses all of the transducer components within the volume typically representing the body 110 of the bait. Electrical energy can be supplied by dissimilar metal battery electrodes, utilizing the water in which the bait is immersed as the battery electrolyte. More preferably, this embodiment receives its electrical power from a separate battery pack 30 in an arrangement similar to the one shown by FIG. 3.

FIG. 16 illustrates a weighted sound pack 112 connected between lines 114, 116 in a Carolina rig arrangement with a trailing bait 118. A signal-generating transducer (not shown) may be included with either the sound pack module 112 or the bait 118. In the latter case, the line segment 116 may be embodied as a conductor/leader 56, such as that illustrated by FIG. 18. An alternative sound pack 122 embodied as a sinker is illustrated by FIG. 17. The sinker 122 may carry the transducer 34 and/or the sound pack 30 components illustrated, for example, by FIG. 1.

The conductor/leader 56 illustrated by FIG. 18 is constructed approximately as a standard leader, but includes a pair of conductors 132, 134, shown hard wired at one end 136 to a transducer 34 contained within a lure 138. The opposite end 140 of the leader 56 is fixed to a threaded connector 142, which turns into a socket 144 provided in a sound pack module 146 containing a sound pack 30.

Any of the circuits illustrated by copending, commonly assigned Ser. No. 07/910,635 may be incorporated into the sound packs and transducers of this invention. FIG. 19 illustrates a currently preferred miniaturized circuit, including practical values of the circuit components, capable of generating the pulse trains illustrated by FIG. 20. These pulse trains represent practical timed patterns for generating useful fish-attracting sounds from an electromechanical or piezoelectric transducer. The pulse trains are internally generated within the IC 150.

Figure 20:
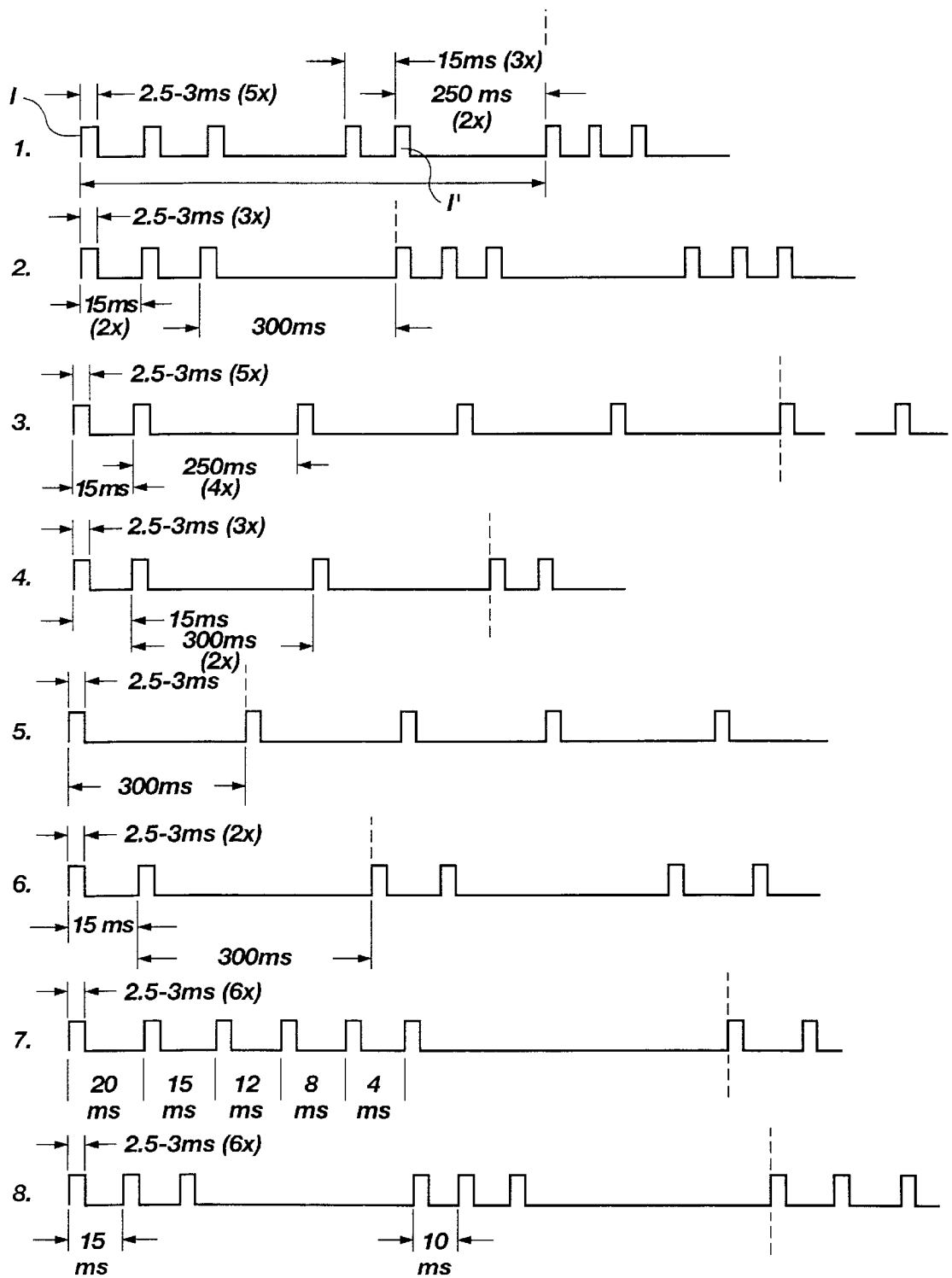
FIG. 20 is a timing diagram of pulse trains useful for driving the transducers of various embodiments of the invention to generate selected sounds.

The chip 150 illustrated is a commercially available sound synthesizer chip capable of outputting a pulse width modulated pulse train. It is representative of a family of programmable IC devices suitable for use in the practice of this invention. In the illustrated instance, all of the pulse trains 1–8 illustrated by FIG. 20 are masked (or embedded) to the chip 150. That is, the standard IC body is subjected to a masking process which "hardware programs" the data required for all eight sound patterns (FIG. 20), any of which can be accessed through proper electrical connection at the input lines ("triggers" or "keys") 152 in conventional fashion. Other embodiments hard program data for a different number of pulse trains, most often a single selected pulse train suitable for a mass produced lure. Ordinarily, a single pulse train (1–8, FIG. 20) will be selected for a particular lure, although embodiments which selectively access a plurality of pulse trains are within contemplation.

The A5391S chip illustrated is capable of producing complex tones at its output. The particular pulse trains illustrated by FIG. 20, are characterized by consistent pulse widths (approximately 2½-3 milliseconds). The sounds actually emitted by an electromechanical transducer 154 are thus perceived as a succession of clicks separated by varying intervals, as documented by FIG. 20. Each of the illustrated pulse trains, 1–8., is characterized by a repeating pattern of defined duration D, starting with an initial pulse I and ending with the initial pulse I" of a subsequent pattern. Pulse train 1, for example, includes five pulses occurring within respective consecutive intervals. The first, second and fourth pulses occur at the commencement of respective 15 millisecond intervals. The third and fifth pulses occur at the commencement of respective 250 millisecond intervals. The timing of pulse trains 2.–8. are similarly recorded on the figure.

For purposes of illustration only, the transducer 154 is represented by an electromagnetic coil, typical of an electromechanical transducer. As illustrated, the chip 150 of FIG. 19 is triggered by the resistance of mineralized water across the contacts 156, 157 of water switch 158. In general, typical ASIC chips 150 can be triggered by either a very low voltage potential or a relatively high impedance across the contacts 156, 157.

FIGS. 21–25 illustrate typical jig lure embodiments of the invention, including the ASIC circuitry of FIG. 20. The transducer 154 may be constructed and arranged to function as an acoustic energy generator, as shown by FIGS. 21 and 22, or it may be modified as shown by FIG. 25 to function as a mechanical energy generator. In any event, a replaceable sound pack, generally 165, houses a pair of batteries 168 and a miniaturized printed circuit board 170 which caries an integrated circuit 172. The sound pack 165 carries external threads 174 which mate with internal threads 176 of a housing 178. An "O" ring is positioned in the annular slot 182 as a water-tight seal.

The assembly illustrated by FIG. 21 includes a leading end cap 184 (FIG. 23), the sound pack 165, turned into the housing 178, an electromechanical transducer subassembly, generally 154, installed at least partially within the housing 178, and a trailing end cap 187 (FIG. 24). These components may be shaped and dimensioned as appropriate to form a jig head, generally 188, connected to a fish hook 190.

The transducer subassembly 154 is shown (FIG. 22) as an electromagnet 192 mounted to a plate 194 which is fit within an inner housing 196, which in turn provides a water tight seal with the housing 178. The electromagnet 192 includes an iron core 198 and functions to flex a transducer diaphragm 200 within the trailing end cap 187. Holes 202 are provided through the cap 187 to permit water to come into direct contact with the diaphragm 200. As illustrated by FIGS. 21 and 22, the transducer subassembly is configured as an audio transducer. The diaphragm 200 is manipulated by an electromagnetic field driven in response to a selected pulse train, thereby moving air (or water) which is perceived as sound. An alternative diaphragm 204 (FIG. 25) carries a structure 206 having significant mass. Substituting the diaphragm 204 for the diaphragm 200 converts the illustrated subassembly to a clapper transducer. The clapper diaphragm 204 is forced to contact the center pole 198 of the electromagnet 192. Energy from the moving mass 206 is transferred to the walls of the jig head 188. The resulting vibration of the adjacent air (or water) is perceived as sound.

Reference to details of the illustrated embodiments is not intended to limit the scope of the appended claims, which themselves recite those details regarded as important to the invention.

What is claimed is:

1. In a fish-attracting system of the type in which a pulse train source is connected in circuit with a transducer to emit signals of predetermined properties, the improvement which comprises:

providing said pulse train source in a first container and said transducer in a second container, at least one of said first and second containers comprising a fish attracting device;

wherein said first container is removably installed in said device; and including a replacement container constructed and arranged to be interchangeable in said device with said first container.

2. An improvement according to claim 1, including a plurality of said replacement containers, each said replacement container carrying a pulse train source constructed and arranged to provide a pulse train different from pulse trains provided by said pulse train sources carried by other of said replacement containers.

3. An improvement according to claim 1, wherein said pulse train source includes a power source mounted within said first container.

4. An improvement according to claim 3, wherein said power source includes a miniature battery.

5. An improvement according to claim 4, wherein said battery is removably installed in said first container.

6. An improvement according to claim 1, wherein said second container is removably installed in said device.

7. In a fish-attracting system of the type in which a pulse train source is connected in circuit with a transducer to emit signals of predetermined properties, the improvement which comprises:

providing said pulse train source in a first container and said transducer in a second container, at least one of said first and second containers comprising a fish attracting device;

wherein said second container is removably installed in said device; and including a replacement transducer container constructed and arranged to be interchangeable in said device with said second container.

8. An improvement according to claim 7, including a plurality of said replacement transducer containers, each said replacement transducer container carrying a transducer constructed and arranged to provide a fish-attracting effect different from the effects provided by said transducers carried by other of said replacement transducer containers.

9. A fishing lure comprising:

a first housing containing a pulse train generator;

a second housing containing a transducer constructed and arranged to produce fish-attracting action in response to pulses emitted by said pulse train generator;

first means for integrating said first and second housings into a unitary structure included within said lure; and second means for connecting an electronic output from said pulse train generator in driving relation with said transducer, wherein said transducer is an electromechanical device.

10. A fishing lure according to claim 9, wherein said electromechanical device includes a flexible diaphragm in association with an electromagnet operably associated with said pulses generator so that said diaphragm is manipulated by a magnetic field fluctuating in response to said pulse train.

11. A fishing lure according to claim 10, including a weight carried by said diaphragm in position such that it moves into and out of contact with structure carried by said lure as said diaphragm is manipulated by said magnetic field.

12. A fishing lure according to claim 9, wherein said first housing is removably installed in said unitary structure; and including a replacement container constructed and arranged to be interchangeable in said unitary structure with said first housing.

13. A fishing lure according to claim 12, including a plurality of said replacement containers, each said replacement container carrying a pulse train source constructed and arranged to provide a pulse train different from pulse trains provided by said pulse train sources carried by other of said replacement containers.

14. A fishing lure according to claim 13, wherein said pulse train source includes a power source mounted within said first housing.

15. A fishing lure according to claim 14, wherein said power source includes a miniature battery.

16. A fishing lure according to claim 15, wherein said battery is removably installed in said first housing.

17. A fishing lure according to claim 9, wherein said unitary structure is configured as a morsel.

18. A fishing lure according to claim 17, wherein said morsel comprises a crank bait.

19. A fishing lure according to claim 17, wherein said morsel comprises a jig bait.

20. A fishing lure according to claim 17, wherein said morsel comprises a resilient imitation creature.

21. A fishing lure according to claim 9, wherein said unitary structure is configured to simulate a natural fish food, and is constructed to possess selected balance and buoyancy properties.

22. A fishing lure comprising:

a first housing containing a pulse train generator;

a second housing containing a transducer constructed and arranged to produce fish-attracting action in response to pulses emitted by said pulse train generator;

first means for integrating said first and second housings into a unitary structure included within said lure; and second means for connecting an electronic output from said pulse train generator in driving relation with said transducer, wherein said second housing is removably installed in said unitary structure.

23. A fishing lure according to claim 22, including a replacement transducer container constructed and arranged to be interchangeable in said unitary structure with said second housing.

24. A fishing lure according to claim 23, including a plurality of said replacement transducer containers, each said replacement transducer container carrying a transducer constructed and arranged to provide a fish-attracting effect different from the effects provided by said transducers carried by other of said replacement transducer containers.

25. A fishing lure according to claim 9, wherein said unitary structure is configured to simulate a natural fish food, and is constructed to possess selected balance and buoyancy properties.

26. A fish-attracting or repelling device, comprising:

a first housing containing a pulse train generator;

a second housing containing a transducer constructed and arranged to produce fish-influencing action in response to pulses emitted by said pulse train generator;

first means for mechanically associating said first and second housings into an operating system; and second means for electrically connecting an electronic output from said pulse train generator in driving relation with said transducer, wherein said transducer is an electromechanical device.

27. A device according to claim 26, wherein said electromechanical device includes a flexible diaphragm in association with an electromagnet operably associated with said pulse train generator so that said diaphragm is manipulated by a magnetic field fluctuating in response to said pulses.

28. A device according to claim 27, including a weight carried by said diaphragm in position such that it moves into and out of contact with structure carried by said device as said diaphragm is manipulated by said magnetic field.

29. A device according to claim 26, wherein at least one of said first and second housings is configured as a morsel.

30. A fish-attracting or repelling device, comprising:

a first housing containing a pulse train generator;

a second housing containing a transducer constructed and arranged to produce fish-influencing action in response to pulses emitted by said pulse train generator;

first means for mechanically associating said first and second housings into an operating system; and second means for electrically connecting an electronic output from said pulse train generator in driving relation with said transducer; and including a replacement container constructed and arranged to be interchangeable in said system with said first housing.

31. A device according to claim 30, including a plurality of said replacement containers, each said replacement container carrying a pulse train source constructed and arranged to provide a pulse train different from pulse trains provided by said pulse train sources carried by other of said replacement containers.

32. A device according to claim 31, wherein said pulse train source includes a power source mounted within said first housing.

33. A device according to claim 32, wherein said power source includes a miniature battery.

34. A device according to claim 33 wherein said battery is removably installed in said first housing.

35. A fish-attracting or repelling device, comprising:

a first housing containing a pulse train generator;

a second housing containing a transducer constructed and arranged to produce fish-influencing action in response to pulses emitted by said pulse train generator;

first means for mechanically associating said first and second housings into an operating system; and second means for electrically connecting an electronic output from said pulse train generator in driving relation with said transducer; and including a replacement transducer container constructed and arranged to be interchangeable in said system with said second housing.

36. A device according to claim 35, including a plurality of said replacement transducer containers, each said replacement transducer container carrying a transducer constructed and arranged to provide a fish-influencing effect different from the effects provided by said transducers carried by other of said replacement transducer containers.

* * * * *